US012636916B2

(12) United States Patent
Pages et al.

(10) Patent No.: US 12,636,916 B2
(45) Date of Patent: May 26, 2026

(54) RUN FLAT DEVICE

(71) Applicant: HUTCHINSON, Paris (FR)

(72) Inventors: Marie Pages, Conflans Ste Honorine (FR); Vincent Joseph, Montargis (FR); Etienne Breton, Escalquens (FR)

(73) Assignee: HUTCHINSON, Paris (FR)

( * ) Notice: Subject to any disclaimer, the term of this patent is extended or adjusted under 35 U.S.C. 154(b) by 158 days.

(21) Appl. No.: 17/936,514

(22) Filed: Sep. 29, 2022

(65) Prior Publication Data

US 2023/0096527 A1 Mar. 30, 2023

(30) Foreign Application Priority Data

Sep. 30, 2021 (FR) .................................. FR2110328

(51) Int. Cl.
| | |
|---|---|
| *B60C 17/04* | (2006.01) |
| *B60C 15/02* | (2006.01) |
| *B60C 17/06* | (2006.01) |

(52) U.S. Cl.
CPC .......... *B60C 17/06* (2013.01); *B60C 15/0209* (2013.01); *B60C 17/041* (2013.01)

(58) Field of Classification Search
CPC ......... B60C 17/00; B60C 17/04; B60C 17/06; B60C 17/041; B60C 17/121
See application file for complete search history.

(56) References Cited

U.S. PATENT DOCUMENTS

| | | |
|---|---|---|
| 3,957,101 A | 5/1976 | Ippen et al. |
| 4,037,635 A | 7/1977 | Ippen et al. |

| | | | | |
|---|---|---|---|---|
| 5,685,926 A | * | 11/1997 | Kejha | .................... B60C 7/24 |
| | | | | 152/157 |
| 2003/0205307 A1 | * | 11/2003 | Rolla | ..................... B60C 17/047 |
| | | | | 152/381.6 |
| 2007/0084535 A1 | | 4/2007 | Resare et al. | |
| 2019/0039422 A1 | * | 2/2019 | Swartz, II | ............. B60C 17/06 |

FOREIGN PATENT DOCUMENTS

| | | | | |
|---|---|---|---|---|
| EP | 0721854 A1 | 7/1996 | | |
| EP | 0836957 A1 | * 4/1998 | ........... | B60C 17/041 |
| FR | 2294865 A1 | 7/1976 | | |
| FR | 2709268 A1 | * 3/1995 | ............. | B60C 17/04 |
| JP | H04262206 A | 9/1992 | | |
| JP | 2001239814 A | 9/2001 | | |
| JP | 2004262394 A | 9/2004 | | |
| KR | 101457545 B1 | * 11/2014 | ............. | B60C 17/04 |

* cited by examiner

*Primary Examiner* — Cedrick S Williams
(74) *Attorney, Agent, or Firm* — FisherBroyles, LLP; Roger L. Browdy; Ronni S. Jillions

(57) ABSTRACT

A run flat device intended to be mounted in a tyre around a wheel rim of a vehicle, the device comprising at least one assembly of two half-shells assembled axially, each half-shell being made of a composite material based on fibres embedded in a thermoplastic or thermosetting resin, each half-shell comprising a radially internal periphery a radially external periphery and a lateral wall connecting the radially internal periphery to the radially external periphery configured so as to form an internal recess within the at least one assembly and each half-shell further comprising a plurality of circumferentially distributed anti-compression ribs extending, within the internal recess, radially from the radially external periphery towards the radially internal periphery.

12 Claims, 12 Drawing Sheets

[Fig. 1]
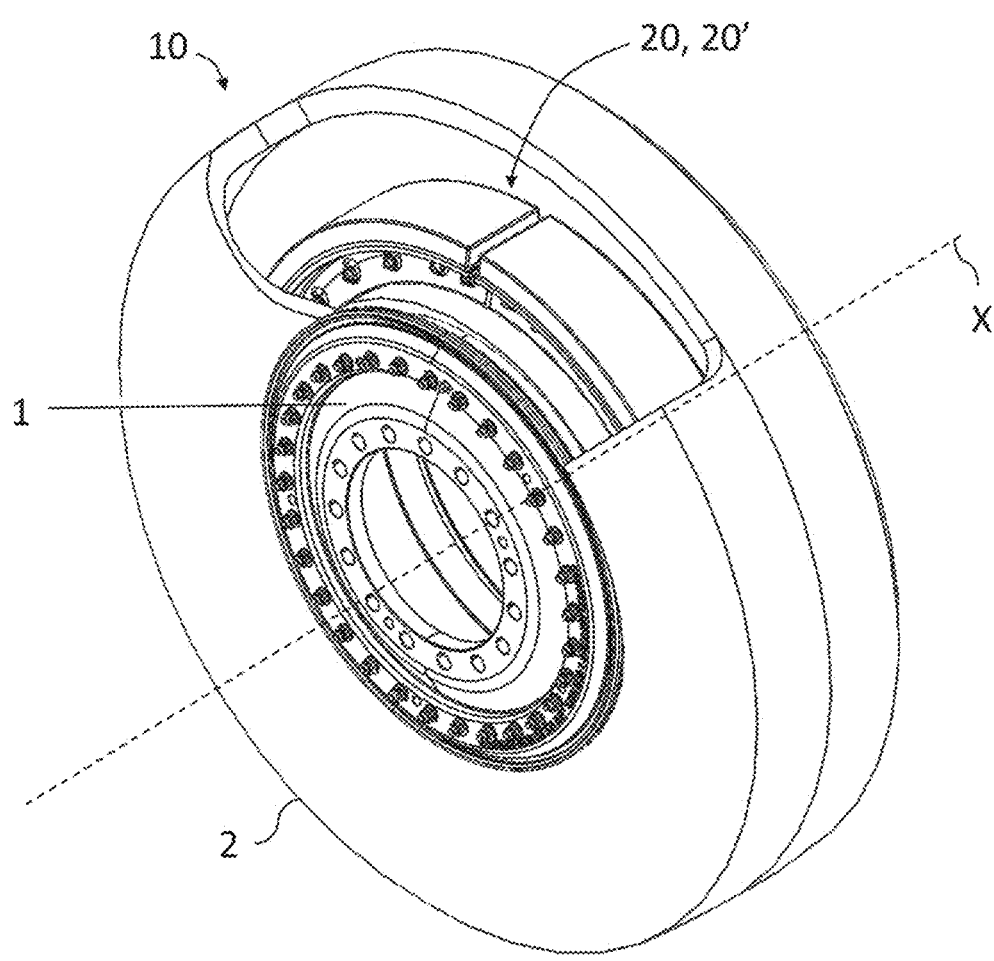

[Fig. 2]
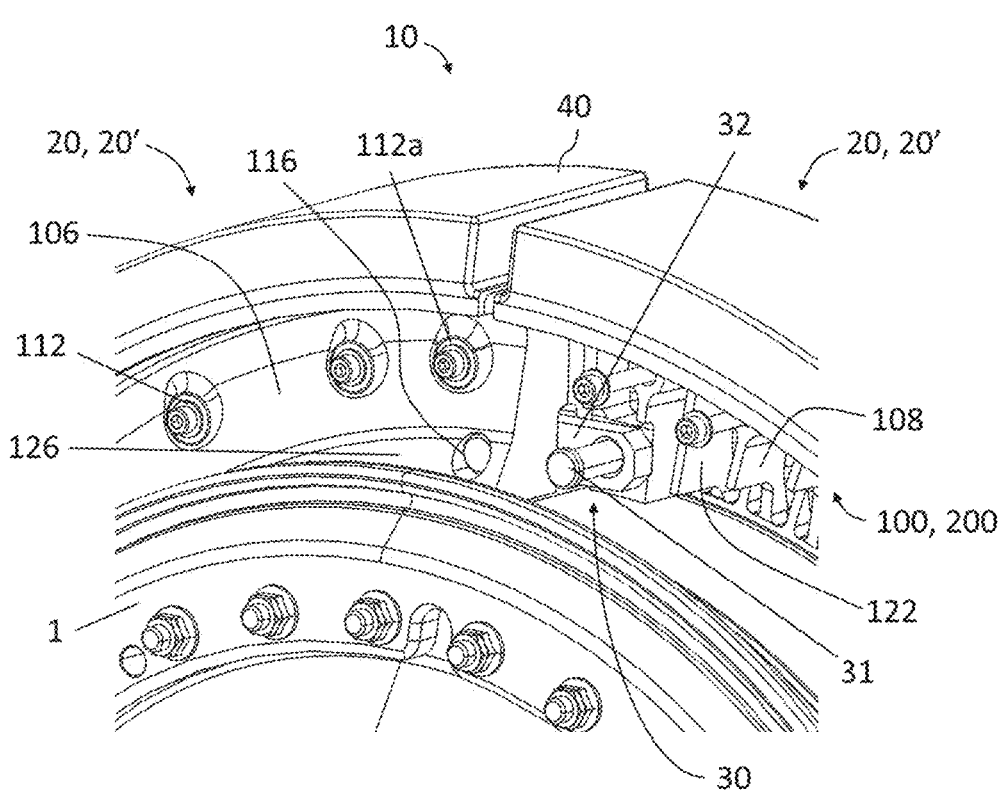

[Fig. 3]
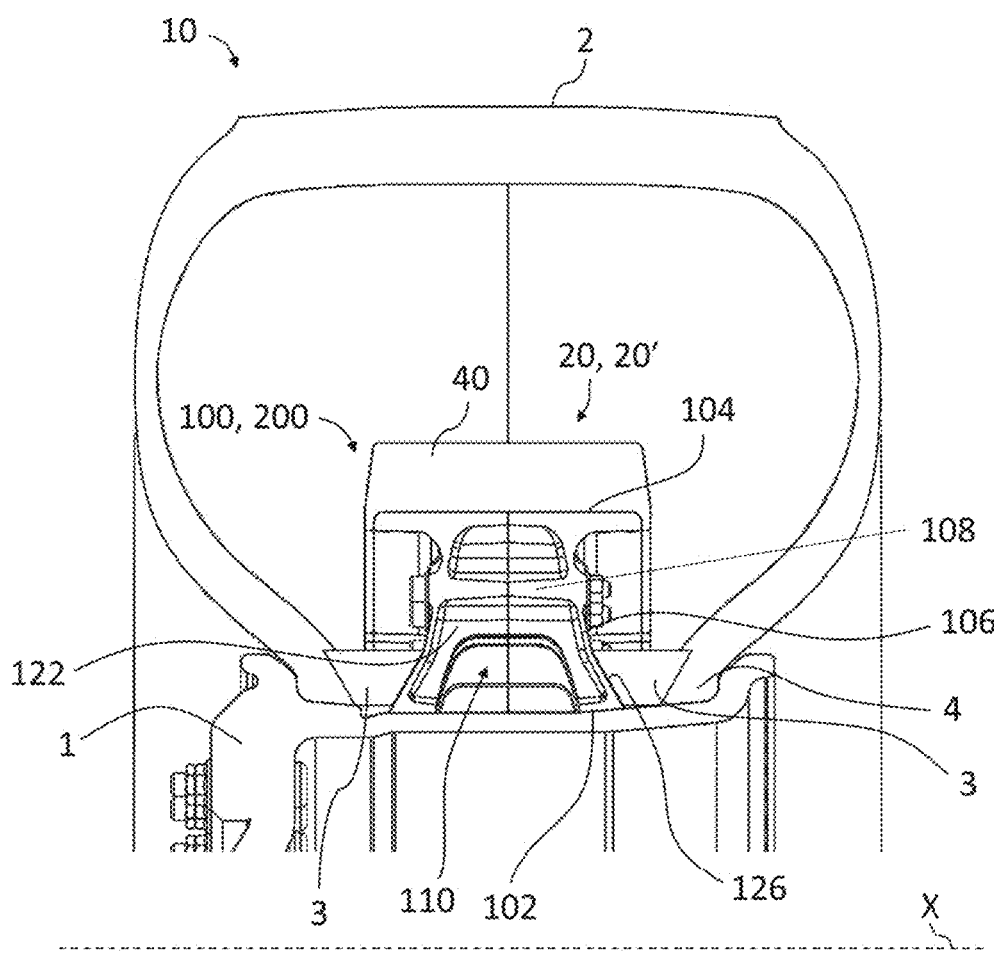

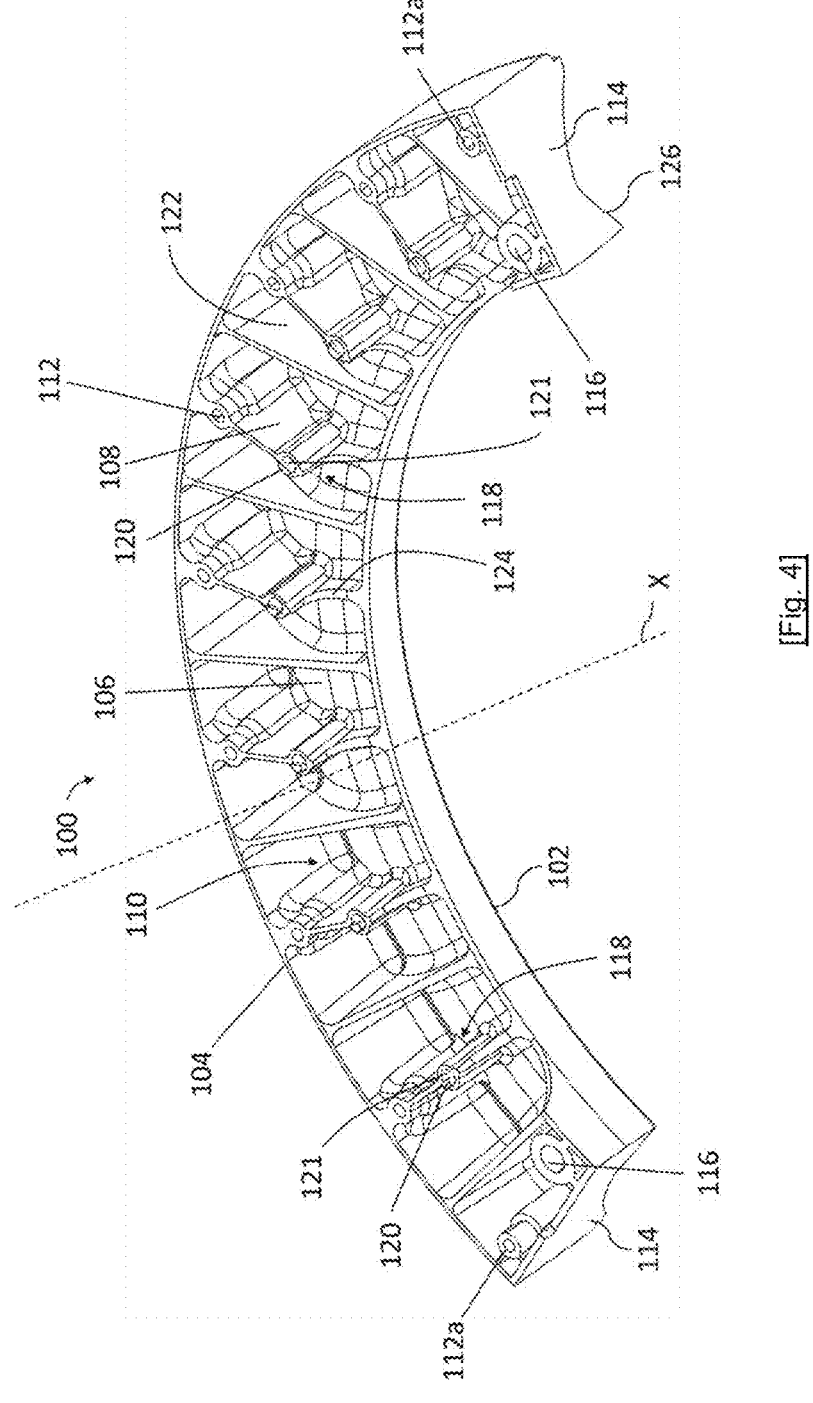
[Fig. 4]

[Fig. 5]
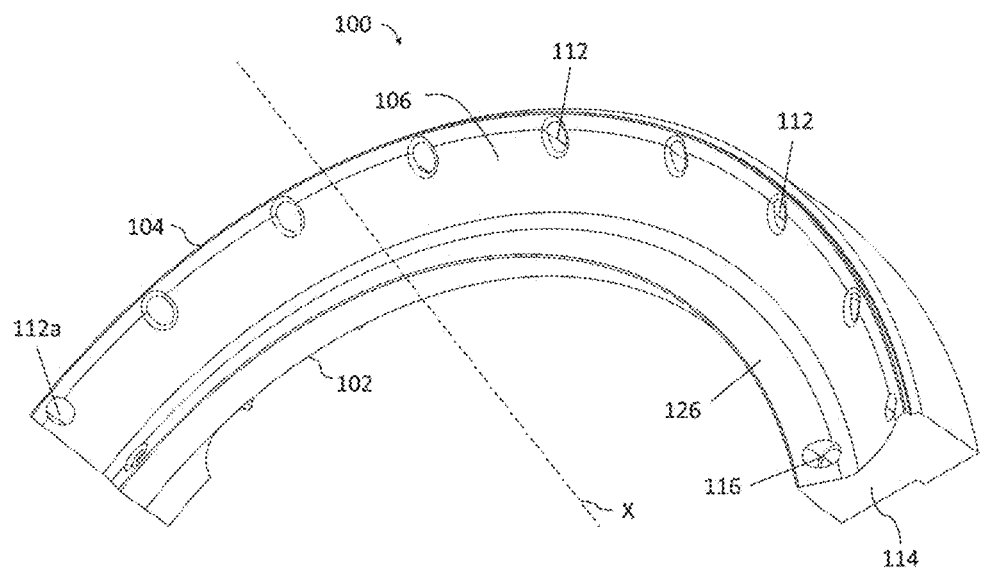

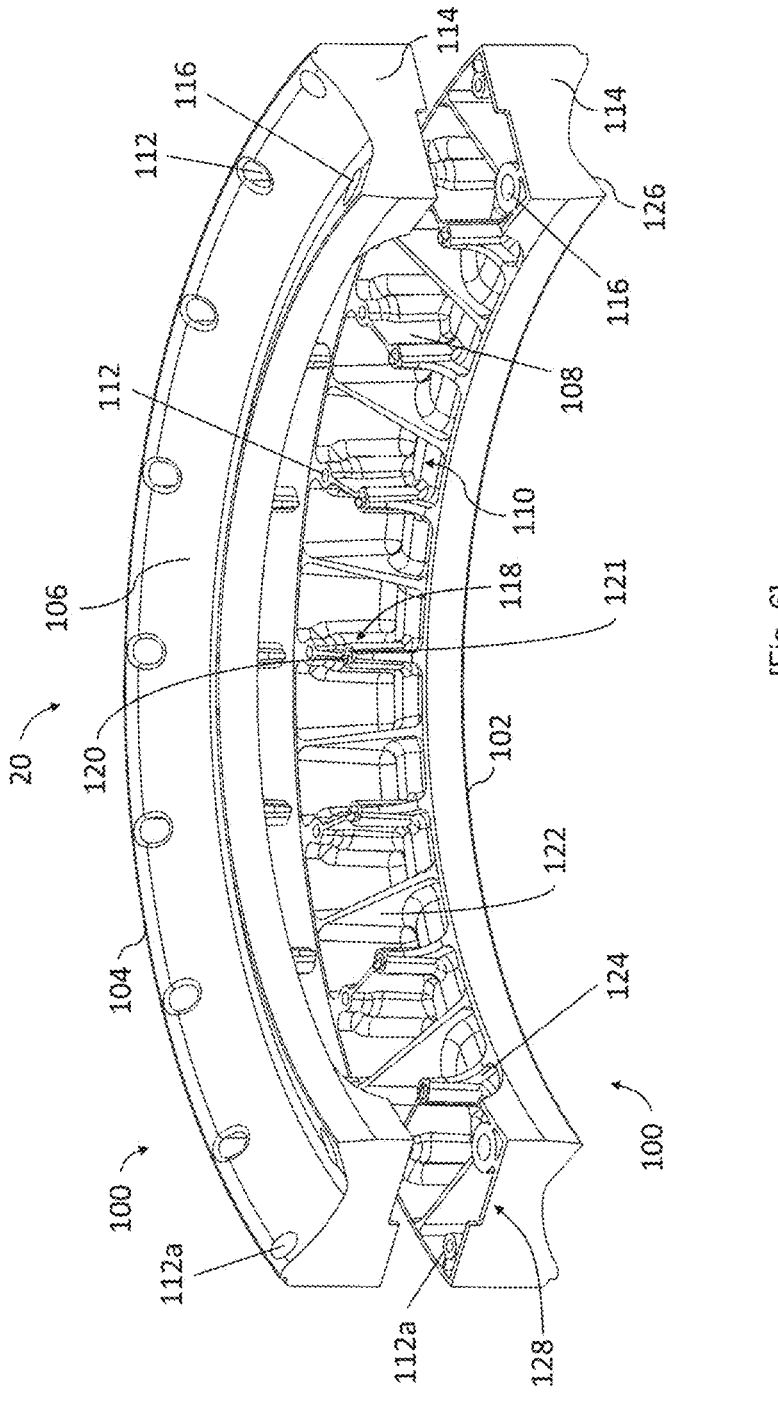
[Fig. 6]

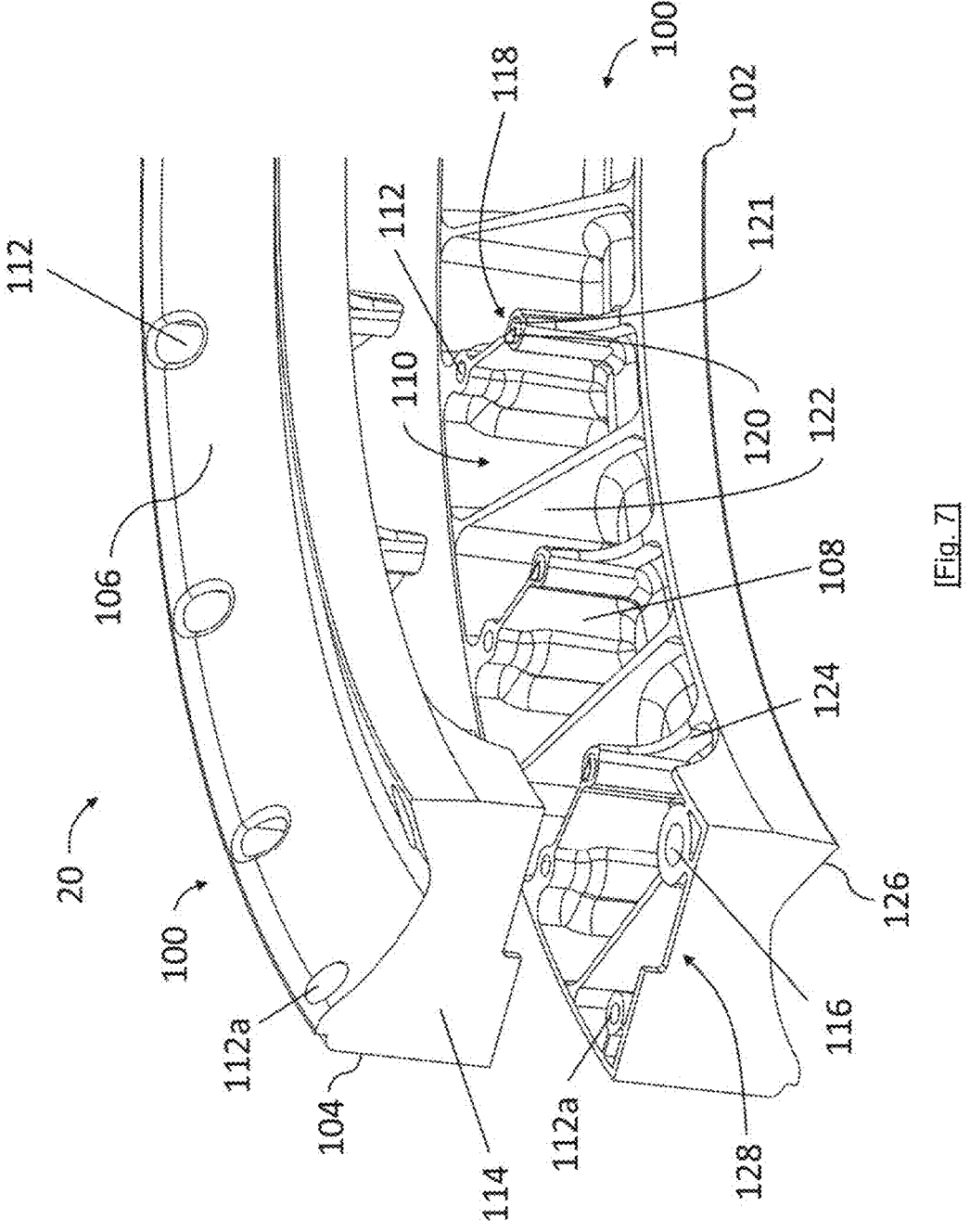
[Fig. 7]

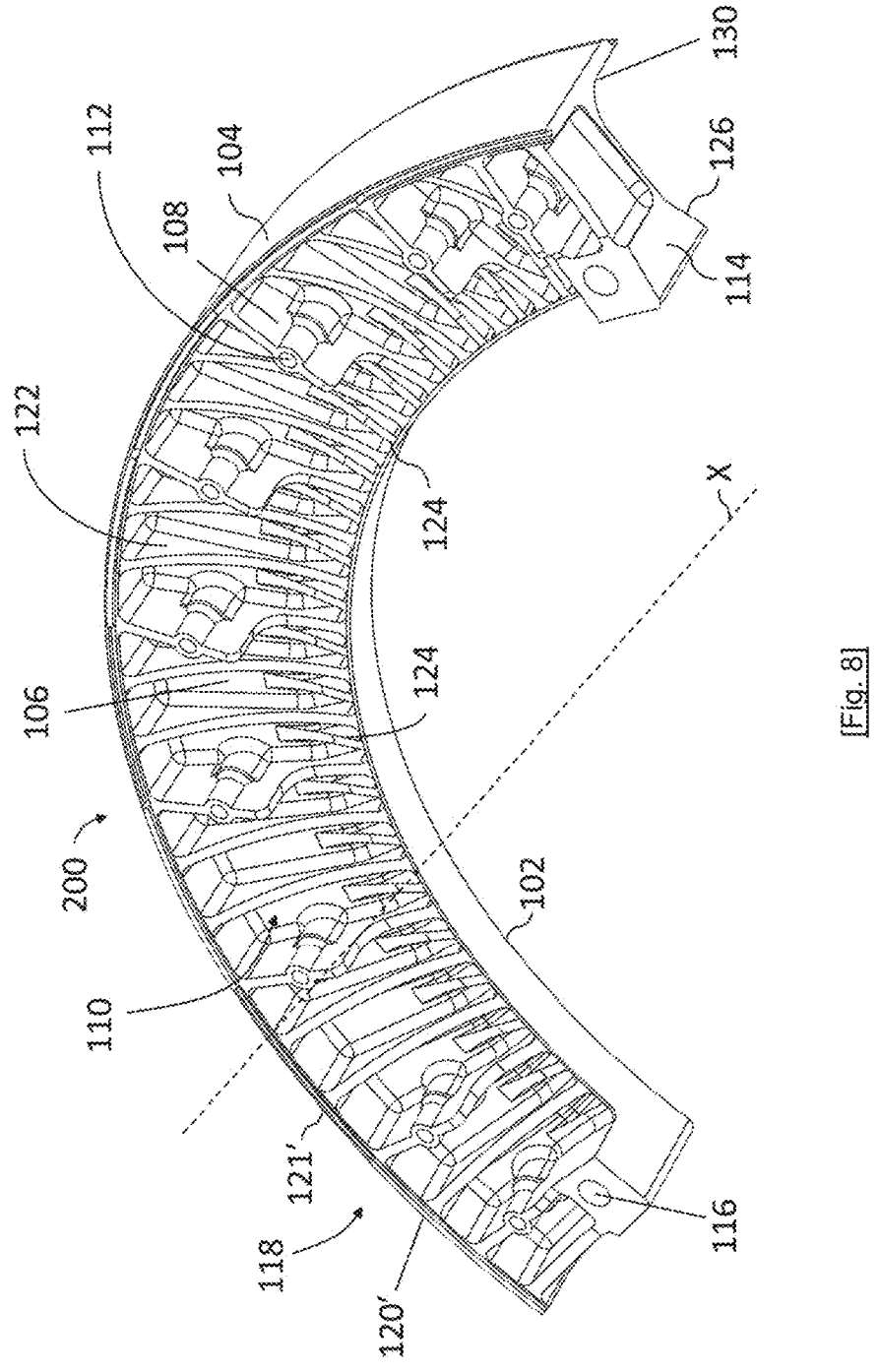
[Fig. 8]

[Fig. 9]
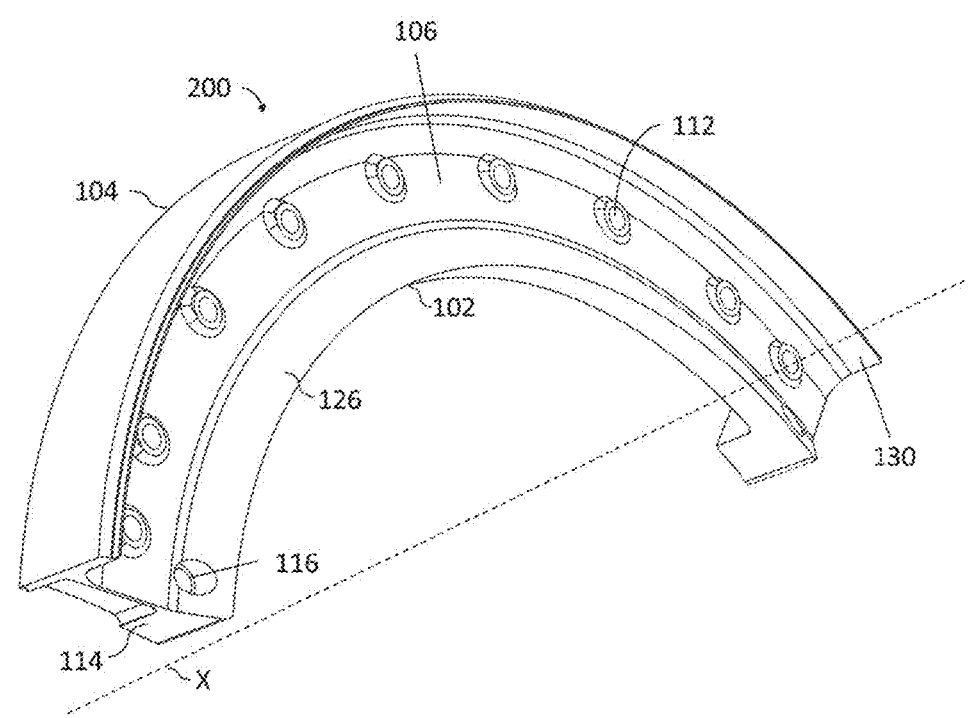

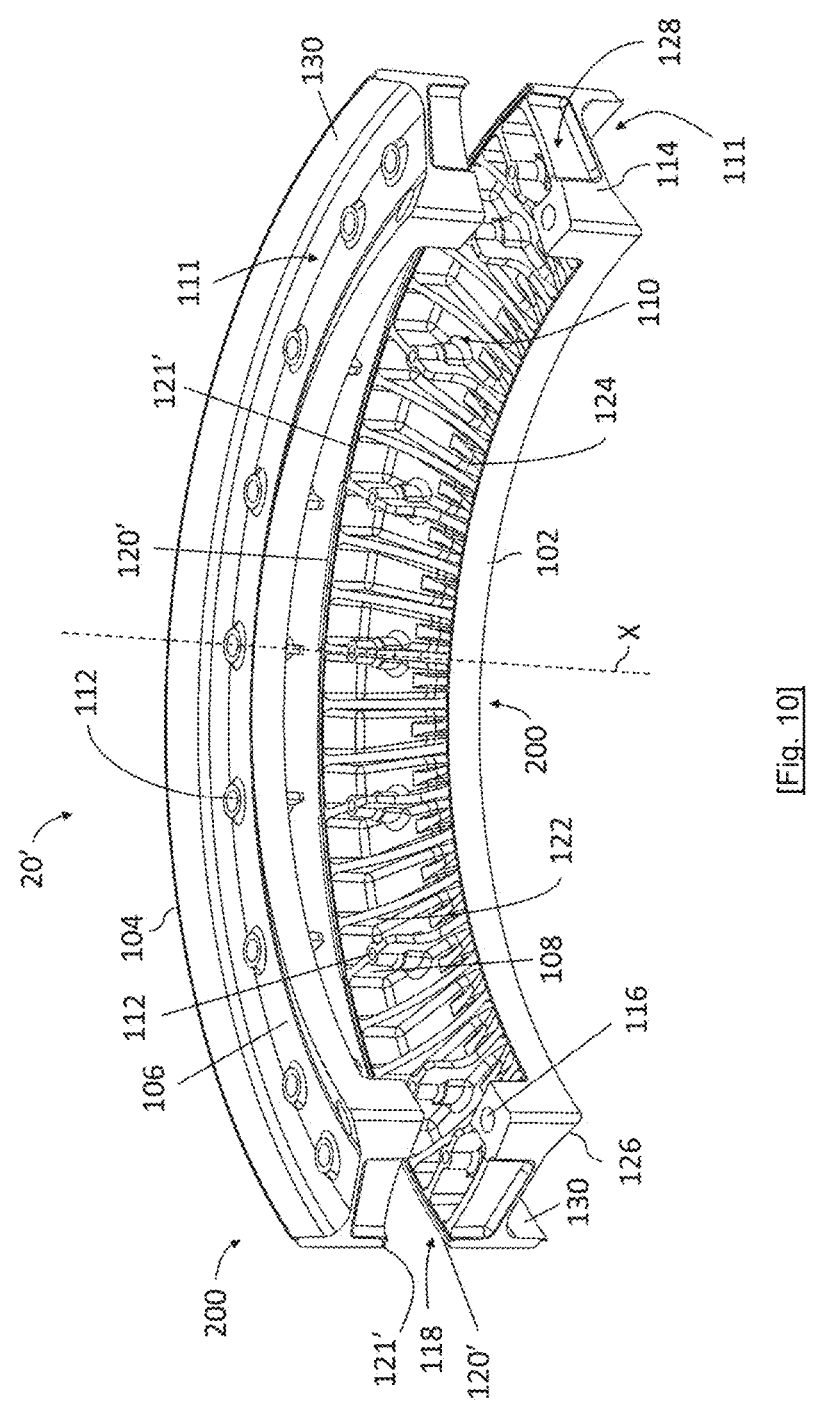
[Fig. 10]

[Fig. 11]
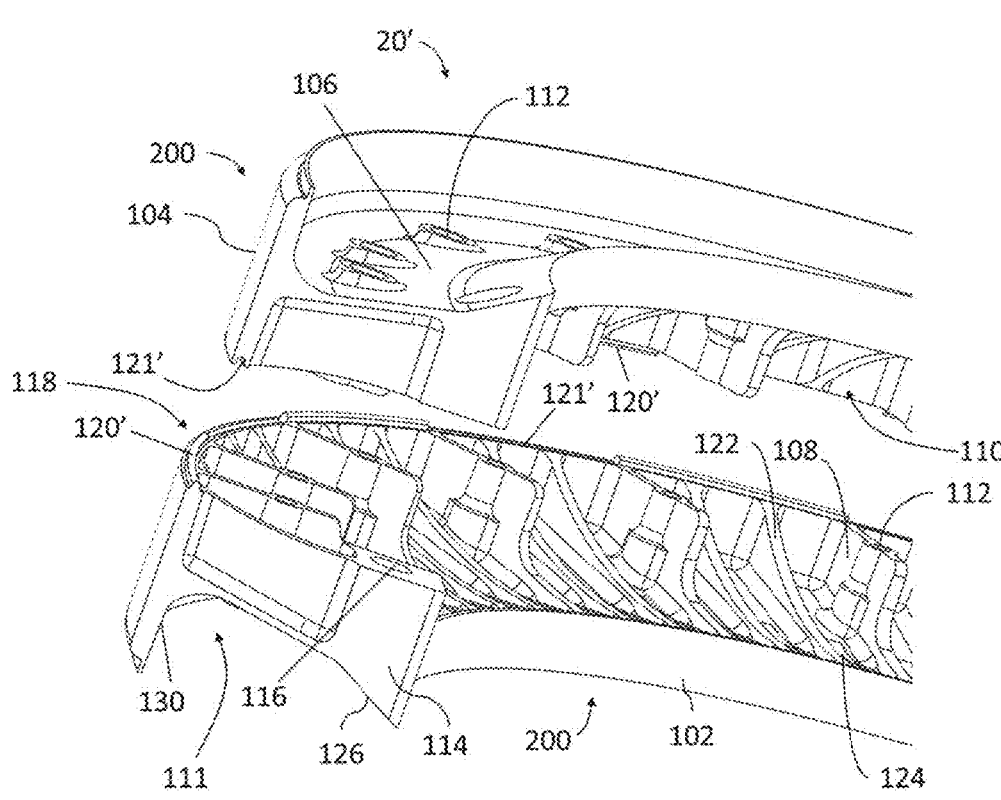

[Fig. 12]

RUN FLAT DEVICE

TECHNICAL FIELD OF THE INVENTION

The present invention relates to a run flat device intended to be mounted around a rim, in particular a wheel rim of a vehicle equipped with tyres.

TECHNOLOGICAL BACKGROUND

The run flat devices are known in the prior art and have already been used in various applications, both civil and military. The purpose of such a device is to allow the vehicle to continue to run in the event of a tyre failure on the wheel on which it is mounted. The tyre failure may be, for example, a blowout or deflation. The run flat device then allows the vehicle to continue running for a certain distance so that it can be repaired or made safe. The run flat device must therefore meet mechanical performance criteria, in particular to support the weight of the vehicle and/or to have a sufficient ballistic resistance.

The document US 2007 084535 A1 describes a type of run flat device intended to be mounted around a vehicle rim. This device is divisible into several hollow sectors, which are circumferentially compartmentalised. Furthermore, such a device is made of a metallic or composite material based on a glass or carbon fibre reinforced resin matrix.

The document EP 07 218 54 A1 also describes a run flat device intended to be mounted around a vehicle rim. This device is divisible into several sectors whose cross-section has a general I-shape. Furthermore, such a device is made of a composite material such as a fibre-reinforced thermoplastic.

Further examples of run flat devices intended to be mounted in a tyre around a vehicle rim are described in the documents JP 2004 262394 A, JP 2001 239814 A and JP H04 262206 A.

The documents U.S. Pat. No. 3,957,101 A and FR 2 294 865 A1 describe solid tyres with no compressed air comprised inside.

However, these run flat devices can have several disadvantages, in particular a high mass that makes the vehicle heavier. The high mass of the device also makes it more difficult to mount.

The invention proposes an improved run flat device, allowing in particular a gain in mass while maintaining mechanical performance at least identical to the devices known in the prior art.

SUMMARY OF THE INVENTION

A run flat device is therefore proposed for mounting in a tyre around a wheel rim of a vehicle, the device comprising at least one assembly of two half-shells assembled axially, each half-shell being made of a composite material based on fibres embedded in a thermoplastic or thermosetting resin, each half-shell comprising a radially internal periphery, a radially external periphery and a lateral wall connecting the radially internal periphery to the radially external periphery configured so as to form an internal recess within the at least one assembly and each half-shell further comprising a plurality of circumferentially distributed anti-compression ribs extending, within the internal recess, radially from the radially external periphery towards the radially internal periphery.

Thus, the invention ensures a gain in mass of the run flat device. In fact, the half-shells, once assembled, form an internal recess, which makes the device lighter. In addition, the device is made lighter by the use of a non-metallic composite material.

The invention also ensures that mechanical performance is maintained. The radially oriented anti-compression ribs allow to reduce the compression of the run flat device due to the pressure exerted by the vehicle on its wheels.

The device, according to the invention, may comprise one or more of the following characteristics, taken alone with each other or in combination with each other:

- each anti-compression rib comprises a hollow cylinder passing axially through it, suitable for receiving a means of attachment between the two half-shells;
- each half-shell comprises centring means complementary to the centring means of the other half-shell;
- the complementary centring means are formed by pins and hollows configured to cooperate with the pins and the hollows of the other half-shell, the pins and the hollows being distributed on and/or between the anti-compression ribs of each half-shell;
- the complementary centring means are formed by lips and grooves configured to cooperate with the lips and the grooves of the other half-shell, the lips and the grooves being located in circumferential alternation at one end of the radially external periphery of each half-shell;
- each half-shell comprises fins extending radially from the radially external periphery towards the radially internal periphery, the fins being distributed circumferentially between the anti-compression ribs;
- at least one fin is located between two anti-compression ribs;
- the fins of a half-shell form, with the corresponding fins of the other half-shell, closed or open partitions in their centre;
- each half-shell comprises a plurality of buttresses at the level of its radially internal periphery;
- the device comprises a plurality of assemblies of two half-shells, the assemblies being attached to each other;
- each half-shell comprises at each of its ends an attachment through orifice so that each assembly is attached to the adjacent assembly by an attachment system with cotter pin;
- each half-shell comprises a frustoconical surface extending circumferentially from the radially internal periphery towards the radially external periphery over at least one portion of the lateral wall, said frustoconical surface being adapted to ensure a positioning of a wedge between said half-shell and a bead of a tyre so that said bead of the tyre is locked against the rim of the wheel.

BRIEF DESCRIPTION OF THE FIGURES

The invention will be better understood with the aid of the following description, given only by way of example and made with reference to the attached drawings in which:

FIG. 1 shows a schematic perspective view of an example of a run flat device according to the invention mounted on a vehicle wheel rim equipped with a tyre, FIG. 2 shows a partial schematic perspective view of the run flat device in FIG. 1, FIG. 3 shows a schematic cross-sectional view of the run flat device of FIGS. 1 and 2, FIG. 4 shows a schematic perspective view of an example of a half-shell according to the invention, in particular its internal portion, FIG. 5 shows another schematic perspective view of the half-shell of FIG. 4, in particular its external portion, FIG. 6 shows a schematic perspective view of an assembly of two half-shells as shown in FIGS. 4 and 5, FIG. 7 shows a partial schematic perspective view of the assembly shown in FIG. 6, FIG. 8 shows a schematic perspective view of another example of a half-shell according to the invention, in particular its internal portion, FIG. 9 shows another schematic perspective view of the half-shell of FIG. 8, in particular its external portion, FIG. 10 shows a schematic perspective view of an assembly of two half-shells as shown in FIGS. 8 and 9, FIG. 11 shows a partial schematic perspective view of the assembly shown in FIG. 10, and FIG. 12 is a diagram illustrating a temperature cycle during the method for manufacturing a half-shell according to the invention.

DETAILED DESCRIPTION OF THE INVENTION

In the following, reference is made to a run flat device 10 intended to be mounted around a wheel rim 1 of a vehicle, and in particular a wheel equipped with a tyre 2.

FIGS. 1 to 3 illustrate a run flat device 10 mounted around a rim 1 and surrounded by a tyre 2. This device 10 extends around an axis of rotation X which, in use, is coincident with the axis of the rim 1 of the wheel of the vehicle. The device 10 comprises at least one assembly 20, 20' of two half-shells 100, 200. In the example shown in FIGS. 1 and 2, the device 10 comprises several assemblies 20, 20'. These assemblies 20, 20' are attached to each other by means of an attachment system 30 with cotter pin 31. This attachment system 30 may comprise a connecting plate 32 interposed between two assemblies 20, 20'. This plate 32 comprises perforations configured for the passage of cotter pins 31. A first cotter pin 31 then passes through the plate 32 and a first assembly 20 while a second cotter pin 31 passes through the plate 32 and a second assembly 20, 20'. Optionally, a rubber strip 40 may cover the radially external periphery 104 of each assembly 20, 20'.

FIGS. 4 and 5 show an example of a half-shell 100 used to form an assembly 20, illustrated in FIGS. 6 and 7, forming part of the run flat device 10. Each half-shell 100 comprises a radially internal periphery 102, a radially external periphery 104 and a lateral wall 106 connecting the radially internal periphery 102 to the radially external periphery 104. The radially internal periphery 102 may have a cylindrical or conical surface.

Each of these half-shells 100 is made of a composite material based on fibres embedded in a resin. It should be understood that the term "fibres" can refer to short fibres, i.e. strictly less than 10 millimetres in size. In particular, this allows to limit the propagation of cracks in the half-shells 100. This term can also refer to long fibres, i.e. greater than or equal to 10 millimetres. In particular, this allows to improve the mechanical strength. More generally, it is also possible that the fibres are continuous fibres. It should be noted that it is possible to use a mixture of these two types of fibres in a same part so as to achieve a hybrid technical effect.

The size of the fibres is therefore chosen in such a way as to find a compromise between the above characteristics.

The fibres can be, for example, but not limited to, glass or carbon fibres. The resin may be thermoplastic or thermosetting and may for example, but not limited to, be polyepoxide, vinylester, phenolic or polyester.

Each half-shell 100 further comprises a plurality of anti-compression ribs 108. These anti-compression ribs 108 are circumferentially distributed and extend radially from the radially external periphery 104 towards the radially internal periphery 102.

The cross-section of each half-shell 100 may, for example, be generally U-shaped, W-shaped, Ω-shaped or the like, so that when axially assembled two half-shells 100 define an internal recess 110 within which the ribs 108 are located. This recess 110 helps to lighten the half-shell 100 and therefore the run flat device 10.

The anti-compression ribs 108 allow the assembly 20 and the run flat device 10 to be reinforced once the half-shells 100 are assembled. These ribs 108 also allow the load applied to the radially external periphery 104 to be transmitted towards the rim 1. These ribs 108 may each comprise a hollow cylinder 112 passing axially through, suitable for receiving a means of attachment between the two half-shells 100.

Each half-shell 100 may comprise circumferential ends 114 at the level of which may be located an additional hollow cylinder 112a axially passing through, suitable for receiving a means of attachment between the two half-shells 100. At the level of its circumferential ends 114 there may also be an axially through orifice 116 through which a cotter pin 31 of the attachment system 30 is intended to pass.

Each half-shell 100 may comprise centring means 118 complementary to centring means 118 of another half-shell 100.

In the example of FIGS. 4 to 7, these centring means 118 are located on the ribs 108, and more particularly on each rib 108. Alternatively, not shown, the centring means 118 may be distributed over every second rib 108. Each centring means 118 may comprise a pin 120 in the shape of a half cylinder and a hollow 121 in the shape of a counterpart of this same pin 120, the pin 120 projecting from the hollow 121. In use, the pin 120 of one half-shell 100 is configured to cooperate with the hollow 121 of the other half-shell 100. In other words, the pins 120 and the hollows 121 are distributed on and/or between the ribs 108 of each half-shell 100.

In one embodiment, not shown, the centring means 118 are formed by alternately distributed pins and hollows in the ribs 108. The pins 120 and the hollows 121 of one half-shell 100 are configured to cooperate with the hollows 121 and the pins 120 of the other half-shell 100. In such a configuration, each half-shell 100 comprises a single rib 108 or an even number of ribs 108.

Each half-shell 100 may also comprise fins 122 extending radially from the radially external periphery 104 towards the radially internal periphery 102. The fins 122 are distributed circumferentially between the ribs 108. In the example of FIGS. 4 to 7, at least one fin 122 is located between two ribs 108.

The fins 122 may have, but are not limited to, a generally triangular or rectangular shape. In use, the fins 122 of one half-shell 100 form partitions with the corresponding fins 122 of the other half-shell 100. These partitions provide radial rigidity to the assembly 20. These partitions can be open or closed in the centre, depending on the rigidity required.

The fins 122 are oriented in the same way as the ribs 108 and improve the mechanical strength of the device 10 once it is assembled, in particular by reinforcing its compressive strength.

It is understood that the alternating ribs 108 and fins 122 form a repeating pattern. In the example shown in FIGS. 4 to 7, the half-shell 100 has seven ribs 108 and nine fins 122, This configuration is not limiting and the half-shell 100 could have more or less ribs 108 and/or fins 122.

Each half-shell 100 may comprise, at the level of its radially internal periphery 102, a plurality of anti-bending buttresses 124. These anti-bending buttresses 124 are circumferentially distributed and extend radially from the radially internal periphery 102 towards the radially external periphery 104. The buttresses 124 may be located in the extension of the ribs 108.

Advantageously, each half-shell 100 also comprises a frustoconical surface 126, The frustoconical surface 126 extends circumferentially from the radially internal periphery 102 towards the radially external periphery 104 over at least on portion of the lateral wall 106. This frustoconical surface 126 is designed to allow the positioning of a wedge 3, shown in FIG. 3, between the half-shell 100 and the bead 4 of the tyre 2 so that the bead 4 of the tyre 2 is locked against the rim 1 of the wheel. The purpose of the anti-bending buttresses 124 is to prevent, in use, the flexion of this area of the device 10 comprising the frustoconical surface 126 and thus to support the wedge 3 of head of tyre 4.

FIGS. 6 and 7 show an exploded view of the assembly 20. In these views, the assembly 20 comprises a slit 128 formed by a shoulder at each end 114 of the half-shells 100. This slit 128 is configured to accommodate the attachment system 30, and in particular the connecting plate 32, to secure the assemblies 20 together.

FIGS. 8 to 11 show another example of a half-shell 200 and assembly 20'. Each half-shell 200 is very similar to the half-shell 100 described above. Thus, each half-shell 200 is made of a composite material based on fibres embedded in a thermoplastic or thermosetting resin. Each half-shell 200 comprises a radially internal periphery 102, a radially external periphery 104 and a lateral wall 106 connecting the radially internal periphery 102 to the radially external periphery 104. Each half-shell 200 may also comprise a frustoconical surface 126 as defined above. Each half-shell 200 further comprises a plurality of circumferentially distributed anti-compression ribs 108 extending radially from the radially external periphery 104 towards the radially internal periphery 102. The cross-section of each half-shell 200 may, for example, be generally U-shaped, W-shaped, Ω-shaped or otherwise such that the axial assembling of two half-shells 200, forming an assembly 20', defines an internal recess 110 within which the ribs 108 are located.

Each rib 108 of a half-shell 200 may comprise an axially through hollow cylinder 112, similar to that described above, suitable for receiving an attachment means between two half-shells 200.

Each half-shell 200 may comprise centring means 118 complementary to centring means 118 of another half-shell 200.

In the example of FIGS. 8 to 11, these centring means 118 are formed by lips 120' and grooves 121' configured to cooperate with the lips 120' and the grooves 121' of the other half-shell 200. The lips 120' and the grooves 121' are located alternately circumferentially at one end of the radially external periphery 104 of each half-shell 200.

In other words, only the hollow cylinders 112 are located on the ribs 108.

Each half-shell 200 may comprise fins 122 extending radially from the radially external periphery 104 towards the radially internal periphery 104. The fins 122 are distributed circumferentially between the ribs 108. In the example of FIGS. 8 to 11, at least two fins 122 are located between two ribs 108.

Each half-shell 200 may comprise, at the level of its radially internal periphery 102, a plurality of anti-bending buttresses 124. These anti-bending buttresses 124 are circumferentially distributed and extend radially from the radially internal periphery 102 towards the radially external periphery 104. A buttress 124 may be interposed between a fin 122 and a rib 108 or between two fins 122.

In the example of FIGS. 8 to 11, the lateral wall 106, extending between the radially internal periphery 102 and the radially external periphery 104, is arranged to form an annular rim 130 at the level of the radially external periphery 104. In this way, in addition to the internal recess 110, an external recess 111 is formed. This makes the half-shell 200 lighter.

In addition, each of the half-shells 100, 200 described above may be monobloc. Ribs 108, centring means 118, fins 122 and buttresses 124 are came from matter with the half-shell 100, 200.

The half-shells 100, 200 of the run flat device 10 can be removed and replaced.

It is clear that the run flat device according to the invention allows for a combination of lightness and strength. In particular, these characteristics allow to reduce the total mass of the run flat device, and therefore of the vehicle intended to be equipped with it, while maintaining the mechanical performance related to compression and the bending.

Another advantage is the improved maintenance of the device when it comprises removable and interchangeable half-shells, it is possible to replace only the damaged half-shell with a new one, without having to replace the whole device. In this way, savings can be made.

Figure 12:
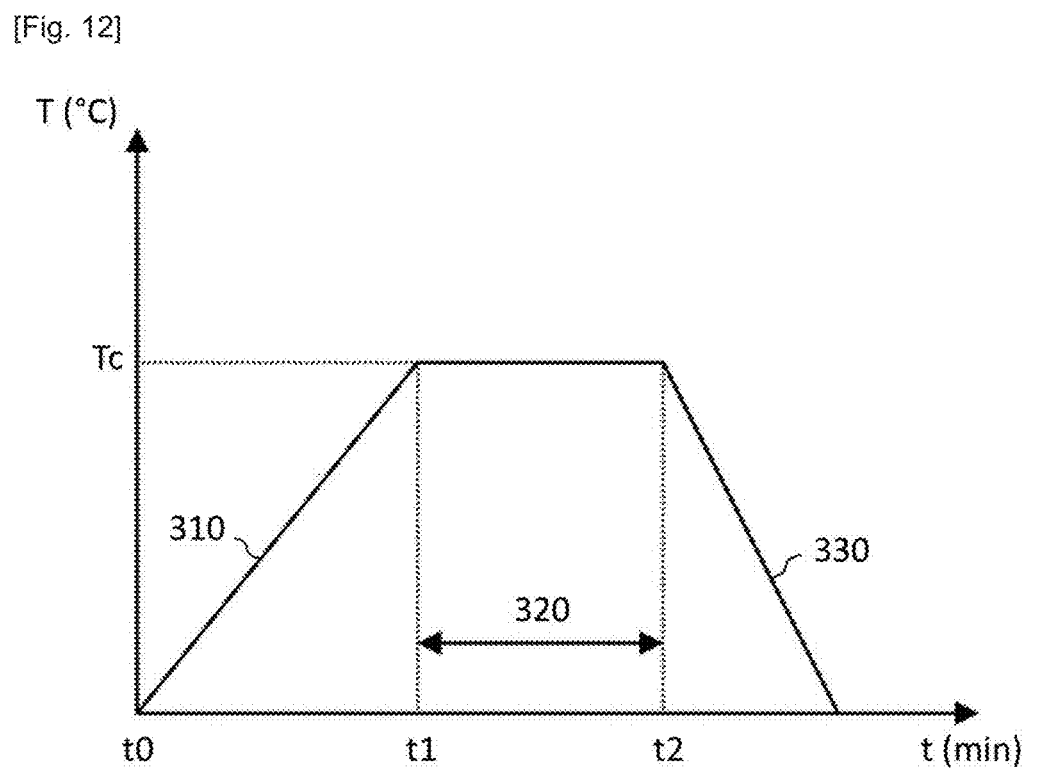

Furthermore, the manufacture of the half-shells 100, 200 is simplified when each half-shell 100, 200 is a single part monobloc. The half-shell 100, 200 can be manufactured by thermocompression. In such a manufacturing method, the material making up the half-shell 100, 200, i.e. the fibres embedded in the resin, is heated and shaped using a mould and a counter-mould. The shaping of the half-shell 100, 200 during the thermocompression method follows a temperature cycle, an example of which is shown in FIG. 12.

In a step 310, during a preheating phase, the material is preheated from t0 to t1, in the mould or out of the mould; t1 corresponding to the time required to reach a setpoint temperature, noted Tc. This setpoint temperature Tc is also referred to as baking temperature.

In a step 320, during a baking phase, the material is baked in its mould at the baking temperature Tc. This temperature Tc is specific to each type of resin. For a given resin, the temperature Tc may be, for example, 150° C. The baking of the material at temperature Tc takes place from t1 to t2 and this baking time also varies depending on the resin, for example 60 minutes for a given resin.

In a step 330, during a cooling phase, the mould containing the shaped material of a half-shell 100, 200 cools from t2 to reach a demoulding temperature, at which the half-shell 100, 200 can be demoulded.

The invention claimed is:

1. A run flat device intended to be mounted in a tyre around a wheel rim of a vehicle, the device comprising at least one assembly of two monobloc half-shells assembled axially, each monobloc half-shell being made of a composite material based on fibres embedded in a thermoplastic or thermosetting resin, each monobloc half-shell comprising a radially internal periphery, a radially external periphery and a lateral wall connecting the radially internal periphery to the radially external periphery configured so as to form an internal recess within said at least one assembly that is axially closed by the lateral wall of each monobloc half-shell and each monobloc half-shell further comprising a plurality of circumferentially distributed anti-compression ribs extending, within the internal recess, radially from the radially external periphery towards the radially internal periphery, wherein each monobloc half-shell comprises a frustoconical surface extending circumferentially from the radially internal periphery towards the radially external periphery over at least one portion of the lateral wall, said frustoconical surface being designed to ensure a positioning of a wedge between said monobloc half-shell and a bead of a tyre so that said bead of the tyre is locked against the rim of the wheel, wherein each monobloc half-shell comprises at the level of its radially internal periphery a plurality of anti-bending buttresses interposed between the anti-compression ribs, each anti-bending buttress being circumferentially distributed and extending radially from the radially internal periphery towards the radially external periphery, each anti-bending buttress being housed in a portion of the internal recess formed by the frustoconical surface.

2. A run flat device intended to be mounted in a tyre around a wheel rim of a vehicle, the device comprising at least one assembly of two monobloc half-shells assembled axially, each monobloc half-shell being made of a composite material based on fibres embedded in a thermoplastic or thermosetting resin, each monobloc half-shell comprising a radially internal periphery, a radially external periphery, and a lateral wall connecting the radially internal periphery to the radially external periphery configured so as to form an internal recess within said at least one assembly that is axially closed by the lateral wall of each monobloc half-shell, and each monobloc half-shell further comprising a plurality of circumferentially distributed anti-compression ribs extending, within the internal recess, radially from the radially external periphery towards the radially internal periphery, wherein each monobloc half-shell comprises at the level of its radially internal periphery a plurality of anti-bending buttresses interposed between the anti-compression ribs, each anti-bending buttress being circumferentially distributed and extending radially from the radially internal periphery towards the radially external periphery.

3. The device according to claim 2, wherein each anti-compression rib comprises a hollow cylinder passing axially through it, suitable for receiving a means of attachment between the two monobloc half-shells.

4. The device according to claim 2, wherein each monobloc half-shell comprises a frustoconical surface extending circumferentially from the radially internal periphery towards the radially external periphery over at least one portion of the lateral wall, said frustoconical surface being designed to ensure a positioning of a wedge between said monobloc half-shell and a bead of a tyre so that said bead of the tyre is locked against the rim of the wheel.

5. The device according to claim 2, comprising a plurality of assemblies of two monobloc half-shells, said assemblies being attached to each other.

6. The device according to claim 5, wherein each monobloc half-shell comprises at each of its ends an attachment through orifice so that each assembly is attached to the adjacent assembly by an attachment system with cotter pin.

7. The device according to claim 2, wherein each monobloc half-shell comprises centering means complementary to centering means of the other half-shell.

8. The device according to claim 7, wherein said complementary centering means are formed by pins and hollows configured to cooperate with the pins and the hollows of the other monobloc half-shell, said pins and said hollows being distributed on and/or between the anti-compression ribs of each monobloc half shell.

9. The device according to claim 7, wherein said complementary centering means are formed by lips and grooves configured to cooperate with the lips and the grooves of the other monobloc half-shell, said lips and said grooves being located in circumferential alternation at one end of the radially external periphery of each monobloc half-shell.

10. The device according to claim 2, wherein each monobloc half-shell comprises fins extending radially from the radially external periphery towards the radially internal periphery, said fins being circumferentially distributed between the anti-compression ribs.

11. The device of claim 10, wherein at least one fin is located between two anti-compression ribs.

12. The device according to claim 10, wherein the fins of a monobloc half-shell form closed or open partitions in their center with the corresponding fins of the other monobloc half-shell.

* * * * *